United States Patent [19]
Borsheim

[11] 3,907,529
[45]*Sept. 23, 1975

[54] AIR CLEANING STRUCTURE

[76] Inventor: Lewis A. Borsheim, 504-31st Ave. North, Fargo, N. Dak. 58102

[ * ] Notice: The portion of the term of this patent subsequent to Feb. 19, 1991, has been disclaimed.

[22] Filed: Feb. 11, 1974

[21] Appl. No.: 441,284

Related U.S. Application Data

[63] Continuation-in-part of Ser. No. 241,587, April 6, 1972, Pat. No. 3,792,573.

[52] U.S. Cl. .................. 55/337; 55/399; 55/413; 55/457; 55/521; 55/DIG. 28
[51] Int. Cl.² ................ B01D 45/12; F02M 35/022
[58] Field of Search ............. 55/337, 395, 397, 398, 55/394, 399, 413, 447, 456, 459, 431, 454, 451, 458, 492, DIG. 28, 521; 209/143

[56] References Cited
UNITED STATES PATENTS

| 458,773 | 9/1891 | Lee ........................................ 55/459 |
| 499,468 | 6/1898 | McNeal ............................... 209/143 |
| 570,443 | 11/1896 | Allington .......................... 55/399 X |
| 775,664 | 11/1904 | McYeety .......................... 55/413 X |
| 1,720,536 | 7/1929 | Young .............................. 55/394 X |
| 2,316,836 | 4/1943 | Breuer .............................. 55/337 X |
| 2,343,682 | 3/1944 | McCurdy ............................. 55/459 |
| 2,666,632 | 1/1954 | Culver et al. ...................... 55/447 X |
| 2,850,162 | 9/1958 | Widmer .......................... 209/143 X |
| 3,568,414 | 3/1971 | Spriggs et al. ..................... 55/337 X |
| 3,696,591 | 10/1972 | Bennett et al. ........................ 55/337 |
| 3,792,573 | 2/1974 | Borsheim ............................. 55/337 |

Primary Examiner—Frank W. Lutter
Assistant Examiner—William Cuchlinski, Jr.
Attorney, Agent, or Firm—Leo Gregory

[57] ABSTRACT

An air cleaner for an internal combustion engine embodying a centrifuging action to direct dust particles into a duct for exhaust to the atmosphere having separated the same for air directed into a chamber of increasing size for reduction of the velocity of said air as it approaches the vents through which it is drawn for passage to said engine.

14 Claims, 7 Drawing Figures

FIG. 7

AIR CLEANING STRUCTURE

BACKGROUND AND SUMMARY OF THE INVENTION

This application is a continuation in part of U.S. application, S. N. 241,587, filed April 6, 1972, now Pat. No. 3,792,573 dated Feb. 19, 1974.

This invention relates to an air cleaner for an internal combustion engine embodying a centrifuging action to separate dust particles from the air and to provide for a reduction in the initial velocity of clean air as it approaches the vents through which it is drawn for passage to the air intake of said engine.

It is an object of this invention to provide an air cleaner for an internal combustion engine which embodies a centrifugal action for the separation of dust particles from incoming air and for directing the same through an enclosed duct running to the atmosphere and which provides for clear air to pass into an area of increased size resulting in a reduction of the velocity of said air for its entry into a passage which runs to the air intake of said engine.

It is another object of this invention to provide an air cleaner of the type above indicated wherein an air passage to receive clean air is disposed in an off center position within the outer housing of said air cleaner.

It is further an object of this invention with respect to an air cleaner of the type above indicated wherein the member receiving cleaner air for passage to the engine has vertically elongated louvered slots with the louvers thereof being disposed in the direction of the flow of air.

It is still another object of the invention herein with respect to the air cleaner above indicated wherein the passage within said air cleaner receiving dust particles for discharge to the atmosphere has a helically disposed bottom wall.

It is still another object of the invention herein to provide an air cleaner having a vertically elongated inlet therein, a deflector wall tangential to the housing of said cleaner to deflect air into said cleaner in a centrifuging action and a screen in connection with said wall overlying said opening into said cleaner.

Generally stated the structure herein comprises a cylindrical housing having a tangential deflection plate directing air inwardly setting up a centrifuging action for separation of dust particles into a radially narrow duct at the inner side of the outer wall of said housing which duct exhausts to the atmosphere and clean air by passes said duct and moves into a chamber portion of increasing size to reduce its velocity in approaching vents through which it is drawn into a passage running to the engine.

These and other objects and advantages of the invention will be set forth in the following description made in connection with the accompanying drawings in which like reference characters refer to similar parts throughout the several views and in which:

DESCRIPTION OF A PREFERRED EMBODIMENT

Referring to the drawings, the air cleaning device 10 which comprises the subject matter of the invention herein consists of a cylindrical outer housing 12 having an outer wall 13, a removable top wall or cover 15, a chamber 16 therein and a bottom wall 19.

Disposed within said outer housing is a means for providing clean air to the engine which comprises an inner housing 25 formed as a tubular member having an outer wall 26, a top wall 27, a second wall 28 spaced below said wall 27, and a chamber or passage 29 therein. Said upper wall is tapped to receive a stud bolt 30 disposed through an accommodating aperture in said cover 15. Said tubular member 25 is disposed within said outer housing 12 to be in an axially off center position with respect thereto as will be further described. Said tubular member extends downwardly of said bottom wall 19 through an accommodating opening 32 therein and preferably is secured thereto.

Spaced upwardly of said bottom wall 19 is a helical flange 34 extending radially between said outer wall 13 and said tubular member 25 defining one revolution about said tubular member and having an upper end portion 36 in vertical alignment with its lower end portion 37 defining an outlet 40 therebetween as will be further described.

Formed in said outer wall 13 is an air inlet 42 formed as a vertical slot opening extending from the flange 34 adjacent its portion 36 and extending to a point just short of the upper end of said outer housing forming a narrow wall 46 therebetween. Said air inlet is positioned to be located in said outer wall in the area thereof which preferably is closest radially to said tubular member 25.

Said slotted opening 42 is further defined by said walls 43 and 44. A wall 47 extends forwardly tangentially to said housing 12 commencing with said side wall 43 and extending forwardly sufficiently to overlie said slotted opening 42 forming a deflector and thus it defines an inlet passage 50 taken with the housing 12. The forward or free end of said wall 47 carries at right angles thereto a slotted flange 49 and an adjacent opposite portion of said housing 12 has a vertical projecting boss 53 which has formed thereon a corresponding slotted flange 54 projecting outwardly thereof. Carried by said oppositely disposed flanges 49 and 54 and slidingly disposed therein is screen 60. It will be understood that said screen may be otherwise secured.

Underlying said wall 47 and said screen 60 and extending to said wall 13 of said housing 12 is a bottom wall 62.

The top wall or cover 15 above mentioned is of a configuration to overlie the housing 12 and to have a portion thereof extending to overlie the upper portion of said wall 47 and said screen 60. Said cover 15 has a slot 15a in its bottom side to receive therein and seat the upper edge portions of said housing, said wall and said screen.

Extending substantially the full extent of said tubular member 25 between the helical flange 34 and the wall 28 are here shown a plurality of slot-like openings 65 disposed circumferentially of said tubular member substantially diametrically opposite of said slotted opening or inlet 42. Said openings are here shown as being louvered. Although a plurality of openings are here shown, a single of such openings has been found to be sufficient for a very satisfactory performance.

Figures 1, 2:
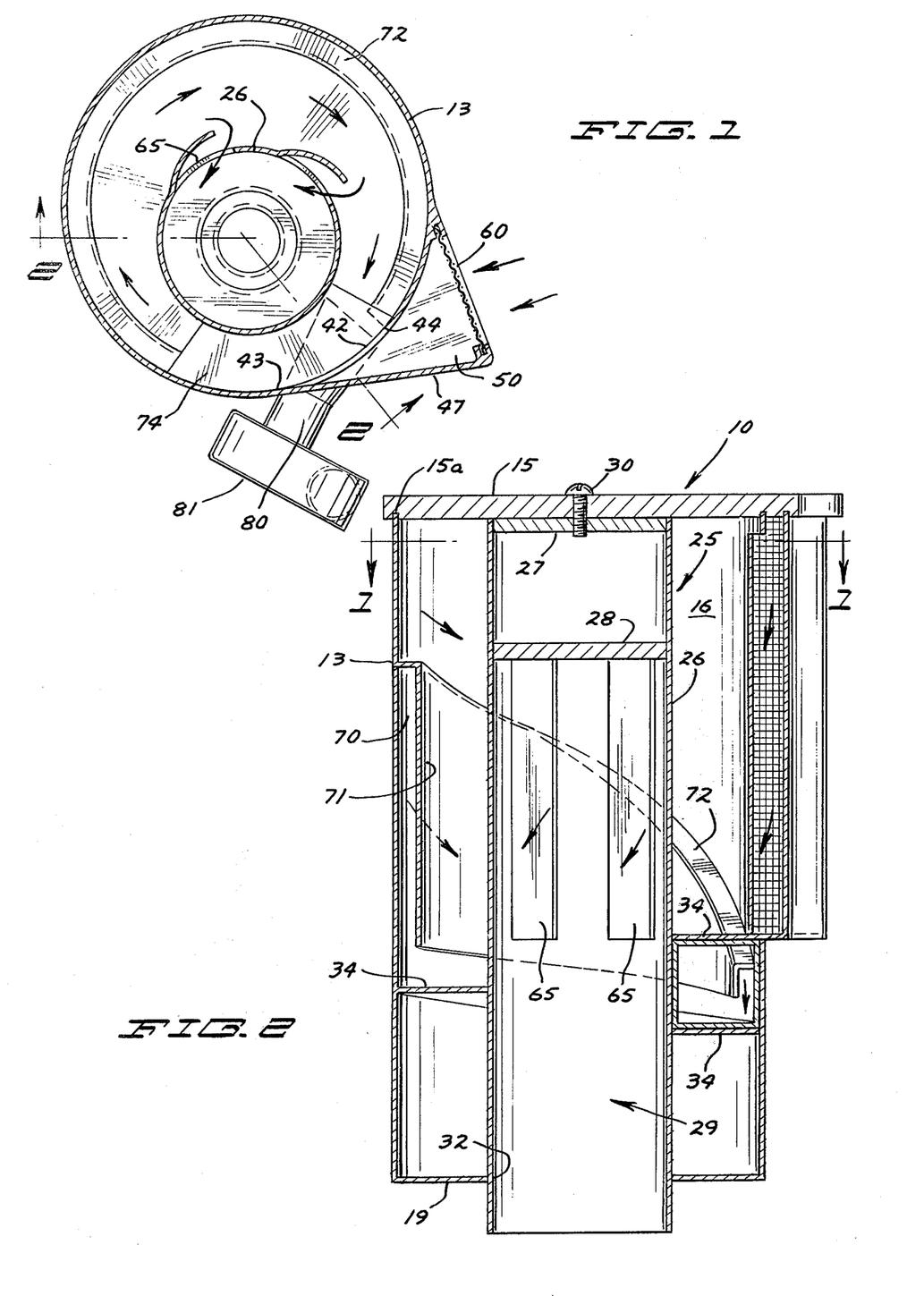
FIG. 1 is a view in horizontal section taken on line 1—1 of FIG. 2 as indicated.
FIG. 2 is a view in vertical section taken on line 2—2 of FIG. 1 as indicated.
Figure 3:
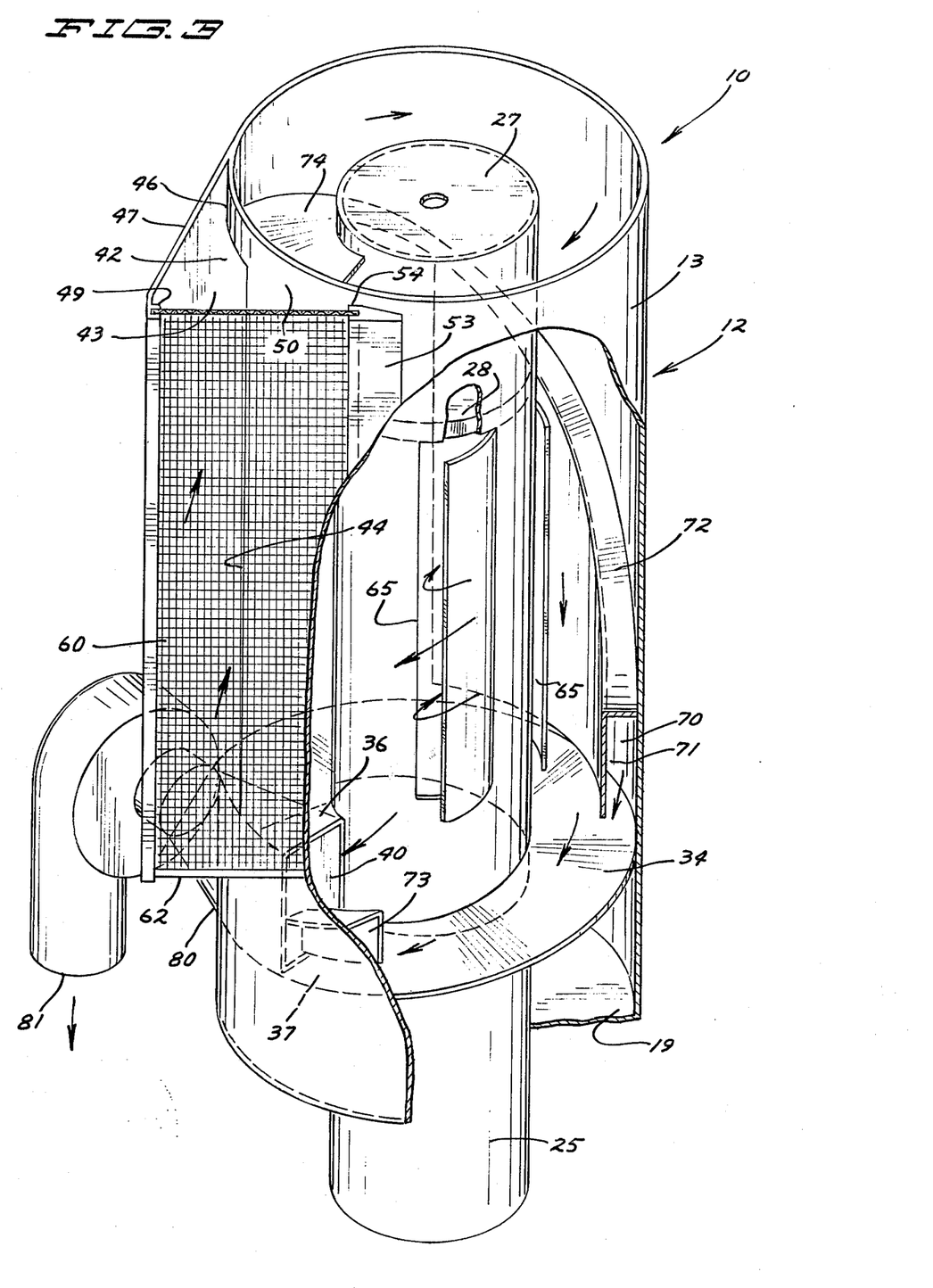
FIG. 3 is a broken view in perspective on an enlarged scale with some portions thereof being removed.

A duct 70 comprising a passage is formed by a wall 71 spaced radially inwardly a short distance from said outer housing wall 13. Said duct has a top wall 72. Said duct declines in height having its top wall define a helical path about the inner side of said wall 13. Said helical flange 32 forms the bottom wall of said duct. Said duct terminates with its discharge end portion 73 extending just within said discharge outlet 40 as indicated in FIG. 3. A forward and upward extension of said top wall 72 is formed as a flange 74 which radially extends between said outer wall 13 and the adjacent wall 26 of said tubular member 25 and extends to a point which overlies the upper end of the inlet 42 and which at such point is just short of engagement with the adjacent portion of the cover 15.

Extending outwardly of said housing 12 from said discharge outlet 40 is an exhaust vent 80 which reduces outwardly in transverse dimension and is shown here carrying at its outer end an exhaust fan member 81 which will draw and exhaust air from said housing as will be described hereinafter.

OPERATION

The air cleaner herein is intended for use with an internal combustion engine as in connection with a tractor such as may be used for farming purposes or for hauling trailers. Such vehicles commonly have a stack providing air passage to the carburetion system of the engine. The air cleaner will be mounted onto the upper end of the stack in an appropriate manner such as by having the lower end portion of the tubular member 25 slipped onto the upper portion of the stack to be clamped thereon.

The action of the engine will draw air into and through the housing 12. The exhaust fan member 81 will provide for sufficient and positive movement of air to pass through the housing 12 irrespective of the engine speed. Thus the air cleaner will operate at a point of maximum efficiency even during the times when the engine may be idling or operating at low speeds.

With the air cleaner suitably mounted in operating position, the action of the internal combustion engine and of the exhaust fan 81 will draw air through the screen 60, into the inlet passage 50 and as deflected by the wall 47 into and through the slot opening 42 for entrance into the chamber of the housing 12. The wall 47 which forms the outer wall of the inlet passage 50 is continuous with the side 43 of said slot 42 and forms a continuation thereof tangential to the housing 12.

The wall 47 in forming a deflector initiates a centrifugal action which carries the dust particles of the air entering the slot opening 42 along the inner side of the wall 13 and into duct 70. The overlying flange 74 confines the upper reach of entering air directing it toward said duct 70. The air moving through said duct 70 is tapered downwardly to the exhaust end portion 73 thereof to be exhausted to the atmosphere through the exhaust passage or vent 80.

With the centrifuging action present drawing the dust particles of the air into duct 70, the air by passing said duct 70 and moving about said center tubular member 25 is clean air. With said tubular member 25 being positioned in an off center position within said housing 12 and having a maximum free space thereabout at its side remote from said outlet 42, the velocity of the air passing about said tubular member will decrease substantially as it passes the vents or inlet openings 65 to be drawn therethrough and through the passage 29 of said tubular member 25 into the air inlet of the engine.

The entrance to the duct 70 is spaced inwardly of said housing 12 spaced from said slot opening 42 sufficiently to permit centrifuging action to effectively separate dust particles from the air passing about said tubular member 25 for passage to the air intake of the engine.

The helical bottom wall 34 provides a downward sloping passage for the exhaust of any dust particles which come to rest thereupon. Said wall 34 also provides for the exhaust of dust particles along the bottom of said passage 70.

It is understood that clean air will continue to move about said tubular member 25 to be drawn into and through the vents 65 for passage downward to the air intake of the engine.

The height and location of the vents 65 and the positioning of the inner tubular member 25 in an off center position as shown here in a preferred embodiment has resulted in unusually high efficiency of operation. Said air cleaner as herein described was subjected to conventional tests for the purpose of determining its efficiency in operation and the tests made indicate an operating efficiency of 95.5 percent. This represents an unusually high degree of efficiency in the operation of an air cleaner for an internal combustion engine.

MODIFICATION

DESCRIPTION

FIGS. 4–7 show as a second embodiment 10a a modification of the device 10 wherein the principal differences are a corrugated or undulated form of a screen which avoids becoming clogged by fairly large airborne particles, a convolute form of housing wherein its configuration forms a tangential inlet, a single vent in the tubular member receiving cleaned air and a duct, receiving and discharging air-borne foreign particles or contaminants, being spaced from said inlet and extending to the discharge outlet from the housing and an outlet is provided for the discharge of particles precipitated adjacent the clean air passage. The device 10a embodying the differences indicated represents a second preferred embodiment.

Figure 4:
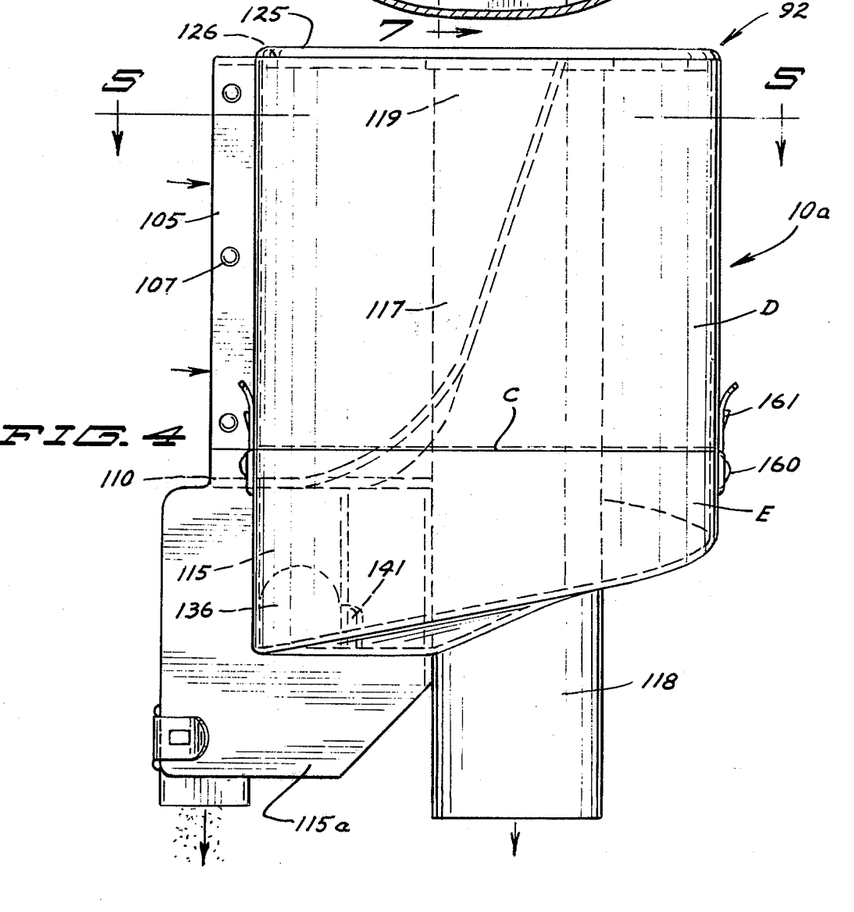
FIG. 4 is a view in side elevation of a modification with portions being shown in dotted line.
Figure 5:
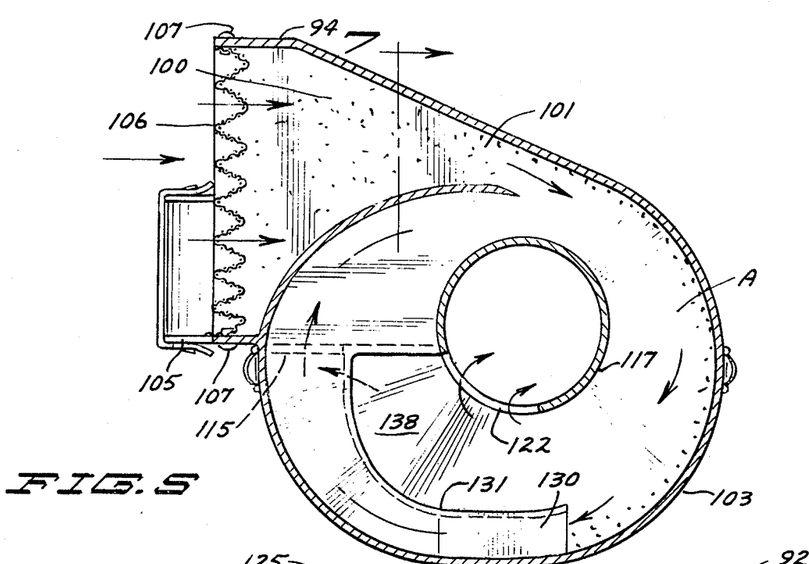
FIG. 5 is a view in horizontal section taken on line 5—5 of FIG. 4 as indicated.
Figure 6:
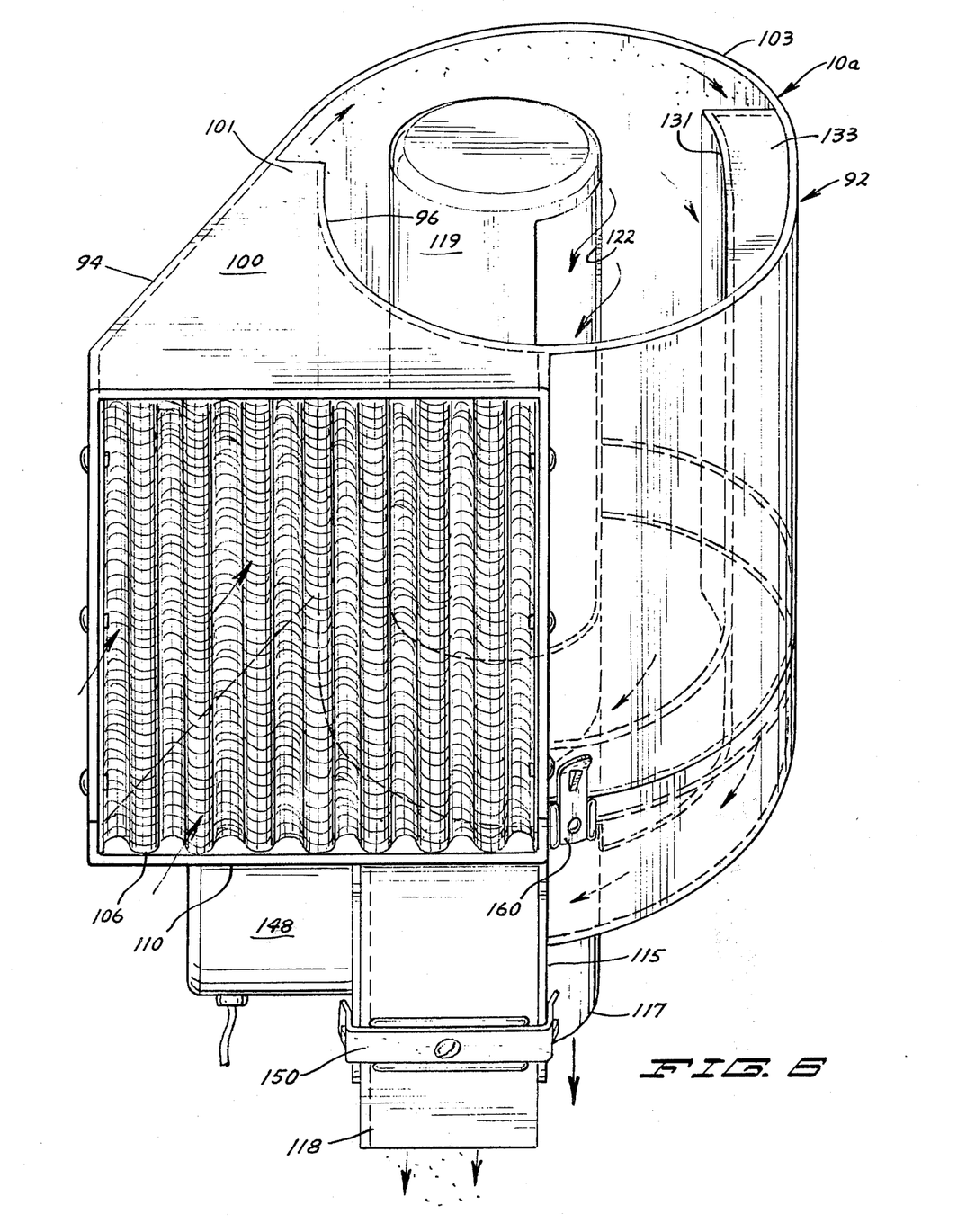
FIG. 6 is a magnified view in front elevation with a portion being removed and portions shown in dotted line.

Referring now to FIGS. 4–7, the device 10a is shown having a housing 92 formed of a plate member shown to be convolute in form having an outwardly extending end wall portion 94 substantially tangential to an inwardly turned end wall portion 96 forming a converging inlet 100 therebetween as best shown in FIG. 6. The inner end of said wall portion 96 is spaced from the adjacent portion of said wall portion 94 to form the narrowed inner inlet end 101 of said inlet 100. An upper or top wall 102 is formed integral with said wall portions 94 and 96 to provide a cover for said inlet.

The main enclosing wall portion 103 forms the main or central portion of said housing which is here shown to be somewhat ovate in form as indicated in FIG. 5.

Projecting outwardly of said portion 96, as indicated in FIG. 6, in alignment with the outer end of said wall portion 94 is a vertical flange 105 and disposed between said flange and said outer end of said wall portion 96 and underlying the outer edge of said top wall 102 is a screen 106 appropriately secured as shown by rivets 107. Said screen in the present embodiment is shown to be rectangular in form and corrugated or undulated in horizontal section as indicated in FIG. 5.

Underlying said housing is a downwardly inclined helical bottom wall 110 commencing as at 111 to underlie said inlet 100 and extending to the point 113 which is in vertical alignment with its point of beginning at which point a vertical wall 115 extends therebetween. Said bottom wall is disposed about an upstanding member 117 here shown to be tubular in form which has a lower portion 118 extending below said bottom wall and an upper portion 119 extending to the plane of the top of said housing. Said tubular member is disposed to be off center with respect to said main housing portion in the direction of and being closely adjacent said inlet at 101 and with the volume within said housing increasing thereabout in the direction away from said inlet and in the direction of travel of an incoming air stream A as indicated in FIG. 5.

Figure 7:
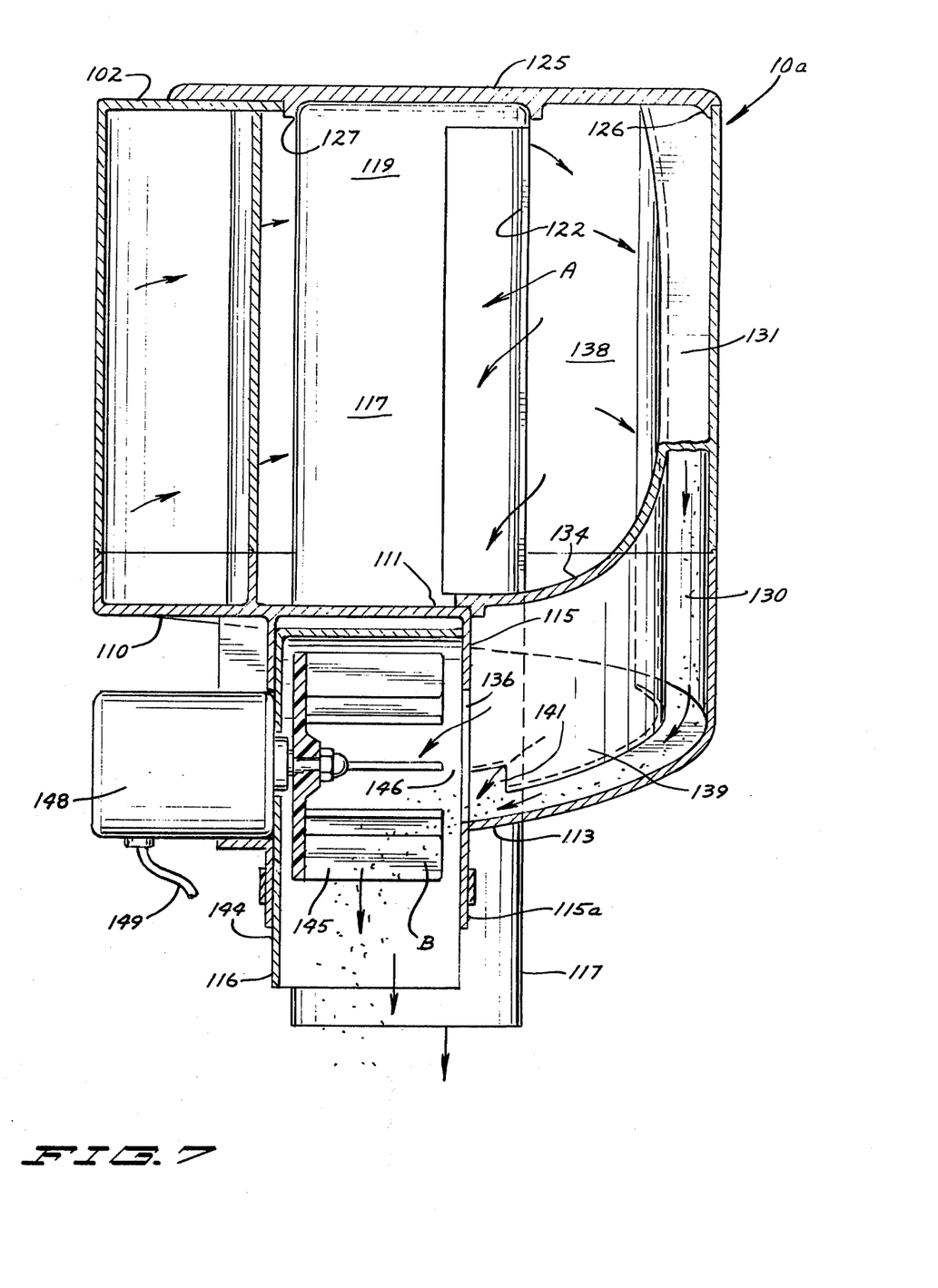
FIG. 7 is a magnified view in vertical section taken on line 7—7 of FIG. 5 as indicated with portions being shown in dotted line.

Formed in said tubular member 117 in the portion thereof facing away from said inlet portion 101 is a vent 122 for substantially the full height thereof above the level of said bottom wall at 111 as shown in FIG. 7.

Overlying said main housing portion 103 is a cover member 125 having an annular depending ledge 126 for a pressure fit within said wall portion 103 and said cover member has a well 127 formed by a depending annular rib at the inner side thereof to receive therein the upper end portion 119 of said tubular member 117.

A duct 130 comprising a passage is formed by an inner side wall 131 spaced radially inwardly a short distance from said outer housing wall 103 commencing as shown here at a point substantially opposite said inner end portion 101 of said inlet 100 and terminating by engaging said vertical wall 115 as shown in FIGS. 5 and 7. Said inner wall 131 at its point of commencement extends the full height of said wall 103. Said duct has a top wall 133 which declines in height sharply and has a lower end portion 134 which declines gradually to engage the adjacent upper end portion of said wall 115 and to be substantially at the level of said bottom portion 111.

Said duct 130 forms a discharge passage having its discharge end at the wall 115 and through the lower portion of said wall 115 is a discharge outlet 136. Said outlet may be variously formed as to its size of opening.

As shown in FIGS. 5, 6 and 7, an annular passage 138 is formed about said tubular member 117 with the lower portion 139 thereof at the inner lower side of said wall 131 having a dead end formed by said wall 115. An opening 141 is present at the lower end portion of said wall 131 adjacent said wall 115 whereby any air-borne particles precipitated in said passage portion 139 will be discharged through said aperture or opening 141 into the duct 130 for discharge through the outlet 136.

Said wall 115 has a portion 115a thereof extending below said bottom wall portion 113 and outwardly thereof and laterally spaced therefrom is a similar wall 116. Together said walls form therebetween a housing to receive a blower housing 144 having a fin or squirrel cage type of exhaust fan 145 journaled therein. Said fan has an opening or inlet 146 thereinto aligned with said discharge outlet 136. Said fan will discharge downwardly to exhaust foreign air-borne particles or contaminants B as indicated in FIG. 7.

Said wall is suitably apertured to accommodate a motor 148 which will have its conductors connected to a suitable electrical current supply.

A bracket clamp 150 is indicated appropriately securing said blower and motor in operating position.

The structure above described is conveniently formed by being molded of a suitable plastic material of which it is believed no specific description is required.

With reference to FIG. 4, a line of demarcation C is indicated wherein except for the screen 110 the upper portion of the housing D is formed in one mold, the cover 125 is formed in a second mold and the lower portion of the housing E is formed in a third mold except for the blower and motor. The lower housing portion E has the tubular member 117 molded therewith.

The upper and lower housing portions D and E are readily assembled and locked together by the spring clip members 160 suitably secured to said lower portion E and being apertured to engage and overlie projecting bosses 161 which are integral with said upper housing.

The description of forming and assembling given herein of the device 10a is for the purpose of one illustration only and not for the purpose of limitation as to method of forming or as to method of assembly of said device.

OPERATION

The operation of the air cleaner 10a is generally as described in connection with the embodiment first above presented.

The housing in being partially convolute in form defines the air inlet between the extended and inwardly turned end portions 94 and 96. The screen member 106 by its undulated cross sectional configuration avoids becoming clogged by fairly large air-borne particles.

As in connection with an internal combustion engine, with the device mounted upon an air intake stack, air is drawn through the inlet 100 to take a course to initiate a centrifugal action to cause entrained or air-borne foreign particles or contaminants to travel along the inner surface of the wall portion 103 to the point of entering the duct 130. Said contaminants are also referred to as solids.

The helical bottom wall 110 and the sharply declining top wall 133 in view of the action of the fan 145 in creating a low pressure area at the outlet end of said duct, all combine to efficiently move contaminants to the outlet 136 of said duct to be discharged by action of the fan 145.

Air entering the inlet 100 in passing about the tubular member 117 enters an area of increasing volume and thus loses considerable velocity in approaching the vent 122. Although said air in closely approaching said vent is substantially free of foreign particles or contaminants, some such particles will precipitate to the bottom portion of the passage 138 due to said reduced velocity of said air. These particles will be drawn off by action or suction of the fan 145 through the outlet 141 and thence be discharged through the outlet 136.

The structure as described is virtually self-cleaning.

It will be understood that although the embodiments of the invention herein described as used in connection with an internal combustion engine, that such use is for purpose of illustration only and not as a limitation upon use. The invention herein is adaptable for use in connection with any air stream having entrained contaminants where the air may be drawn through the device to provide a pre-cleaned air supply.

It will of course be understood that various changes may be made in the form, details, arrangement and proportions of the product and in the steps and sequence of steps of the method without departing from the scope of applicant's invention which, generally stated, consists in a product and method capable of carrying out the objects above set forth, such as disclosed and defined in the appended claims.

I claim:

1. An air cleaner removing entrained solids from an air stream and providing cleaned air comprising
a housing having a curved side wall forming a central chamber, said housing having top and bottom members,
air inlet means attached to said side wall and communicating with said central chamber, said air inlet means directing incoming air and the solids entrained therein tangentially into said housing and in cooperation with said side wall causing the removal of said entrained solids from said air,
an air conduit member within said housing offset from the center of said central chamber of said housing and having an air inlet receiving cleaned air from said central chamber and having air exit means for discharging said cleaned air thus received,
an enclosed duct located adjacent to the inner surface of said side wall forming said central chamber, said duct having an inlet receiving separated entrained solids from said incoming air and a discharge end discharging said entrained solids from said housing, and
said duct decreasing in height from its inlet toward its discharge end.

2. The structure set forth in claim 1, wherein
said air conduit member is offset from the center of said central chamber in the direction of said air inlet means.

3. The structure set forth in claim 1, wherein
said wall of said housing forms a continuous curved planar surface,
said air inlet means being tangential to the adjacent wall portion of said central chamber.

4. The structure set forth in claim 1, wherein
said housing has means discharging therefrom solids separated from said air stream, and
said discharge end of said duct engages said discharging means.

5. An air cleaner having in combination
a housing formed with an outer wall,
an inner wall spaced from said outer wall forming a duct of narrow radial width within said housing,
said duct decreasing in height from its inlet toward its outlet end and having an overlying top wall,
said housing having an outlet discharging therefrom,
said outlet end of said duct communicating with said outlet of said housing,
an inlet into said housing tangential thereto,
an upright member within said housing disposed in an axially off center position with respect thereto,
said member having a vent therein, and
a passage in said member communicating with said vent.

6. An air cleaner having in combination
a housing comprised of a plate member partially convolute in form,
said plate member forming an outer wall of said housing and having a portion thereof forming an inner wall spaced from an adjacent portion of said outer wall forming therebetween an inlet into said housing,
a screen overlying said inlet,
said housing having an outlet spaced from said inlet,
an inner wall member disposed inwardly of an outer wall portion of said housing spaced therefrom to form a duct of narrow radial width therewith,
said duct having an inlet spaced from said inlet of said housing and having an outlet communicating with said outlet of said housing,
a top wall of said duct declining from said inlet toward said outlet of said duct,
an upright member within said housing disposed in an axially off center position in said housing providing a passage of increasing volume substantially thereabout from said inlet of said housing in the direction of said outlet of said housing,
said upright member having a vent therein, and
a passage in said upright member communicating with said vent.

7. The structure set forth in claim 6, wherein
said housing has a bottom wall defining a helical path from said inlet of said housing about said upright member to said outlet of said housing.

8. The structure set forth in claim 6, wherein
said upright member has a passage thereabout extending from said inlet into said housing to said outlet from said housing,
a wall defines the outlet end of said passage adjacent said outlet of said housing, and
said last mentioned wall has an outlet therein adjacent the bottom thereof communicating with said outlet from said housing.

9. The structure set forth in claim 8, including
a discharge means carried by said housing communicating with said outlet from said housing.

10. The structure set forth in claim 6, wherein
said inlet end of said duct is spaced from said inlet of said housing and said outlet end of said duct engages said outlet of said housing.

11. An air cleaner having in combination
a cylindrical housing formed with an outer wall,
an inner wall spaced from said outer wall forming a duct of narrow radial width within said housing,
said duct decreasing in height from an inlet end toward an outlet end thereof and having an overlying top wall,
an inlet into said housing tangential thereto and having communication with the adjacent inlet end of said duct,
an upright member within said housing disposed in an axially off center position with respect thereto in the direction of said inlet and with respect to said duct partially thereabout,
said upright member having a vent therein, and a passage in said upright member communicating with said vent.

12. The structure set forth in claim 11, wherein said duct at its inlet end extends substantially the full height of said inlet of said housing, said top of said duct defining a helical path to said outlet end of said duct, and an outlet extending outwardly of said housing receiving therein said outlet end of said duct.

13. The structure set forth in claim 12, including a discharge means carried by said housing cooperating with said outlet extending from said housing.

14. The structure set forth in claim 11, including a screen member overlying said inlet into said housing.

* * * * *